(No Model.)

J. S. DUNLAP.
COFFEE POT.

No. 520,039. Patented May 22, 1894.

Witnesses —

Inventor.
John S. Dunlap.
By L. M. Thurlow
his Atty.

UNITED STATES PATENT OFFICE.

JOHN S. DUNLAP, OF PEORIA, ILLINOIS.

COFFEE-POT.

SPECIFICATION forming part of Letters Patent No. 520,039, dated May 22, 1894.

Application filed July 18, 1893. Serial No. 480,866. (No model.)

*To all whom it may concern:*

Be it known that I, JOHN S. DUNLAP, a citizen of the United States, residing at Peoria, in the county of Peoria and State of Illinois, have invented certain new and useful Improvements in Coffee-Pots; and I do hereby declare the following to be a full, clear, and exact description of the invention, such as will enable others skilled in the art to which it appertains to make and use the same.

This invention relates to improvements in coffee pots.

The object of the invention is to provide a coffee pot with means whereby the coffee may be kept above and out of the water or infusion being made therefrom, and that the said water may be forced up above the coffee and from thence be sprinkled or sprayed upon it through which it percolates producing most desirable results.

Figure 1:
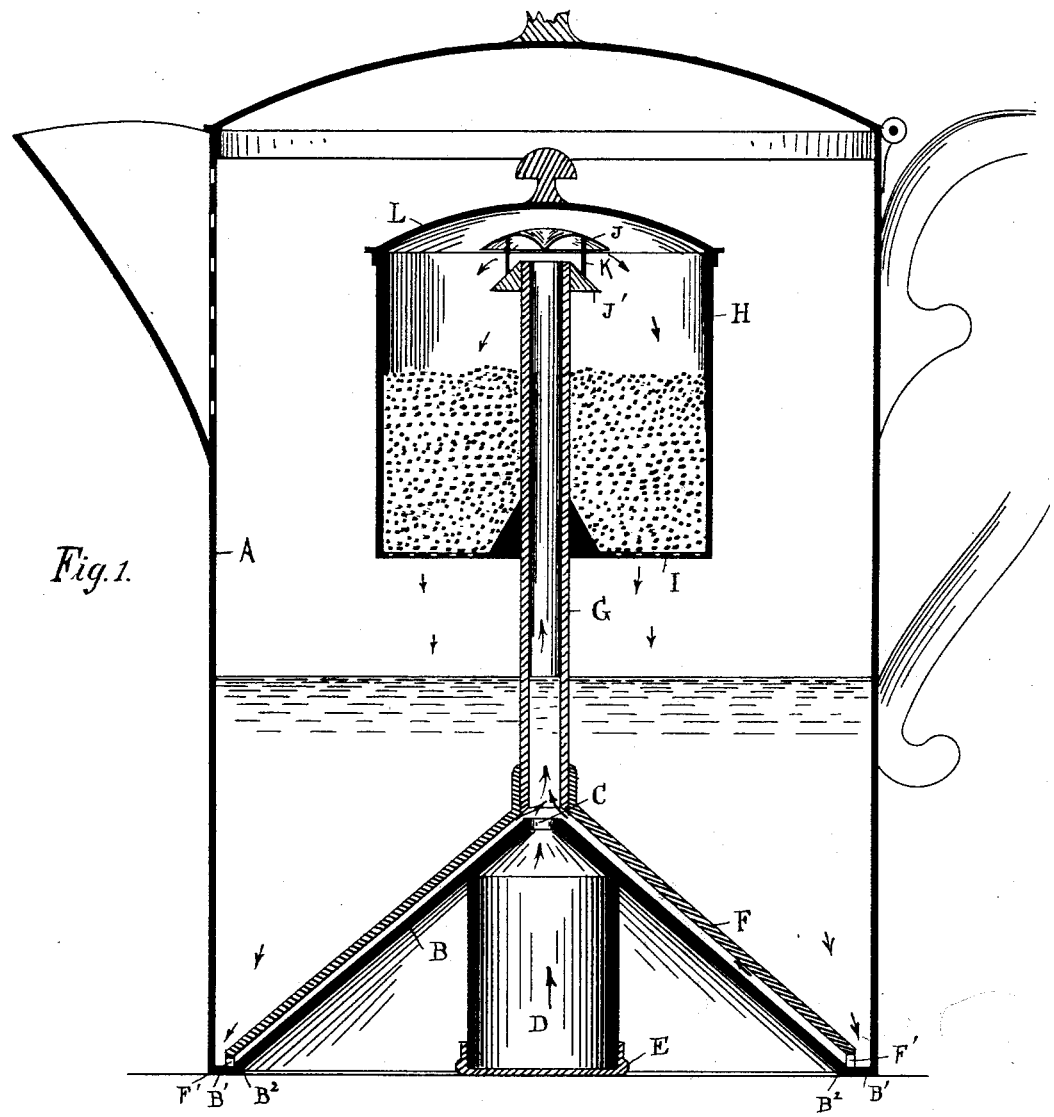
Figure 2:
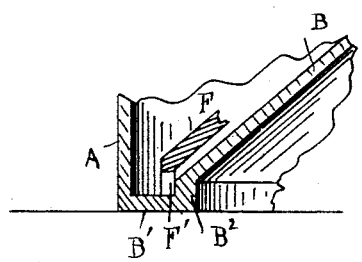

In the drawings hereunto annexed, Figure 1 represents a sectional elevation of the pot and its parts. Fig. 2 is a sectional elevation, much enlarged, of a portion of the bottom of the pot showing peculiar construction.

A represents the body of the pot and the peculiar construction of the bottom B of the same. The said bottom is in the form of a cone whose base is made into a flat rim or edge B', said rim is sharply depressed forming an offset or shoulder $B^2$. Beneath said cone and at its center a receptacle is formed extending from the apex of said cone on its under surface to a line drawn across the base of the pot thus forming a central bearing surface of said bottom. Through the apex of said receptacle and cone B is an orifice C, the purpose of which will be presently shown. The said receptacle D is provided with a removable cap E for closing the lower end of same.

F is a second cone retained in position by means of suitable lugs or feet F' at its base which fit against the shoulder $B^2$ before described and rest upon the flat rim B' formed for this purpose on the said cone B. A suitable space is provided for by this arrangement between the two cones, for a free circulation of water. Into the apex of said cone F is inserted a tube G which leads to the upper part of the pot and upon the upper portion of said tube is placed a vessel or covered cup H into which the coffee is placed.

The cone F may simply be an enlargement of the lower end of the tube G. This said enlargement of tube G to form the cone may be very materially decreased without detriment to the proper operation of the device. Other means for supporting the cone F and tube G may be used. The bottom of the cup H is suitably perforated to permit free discharge of water while retaining the coffee. Upon the upper free end of said tube is secured a suitable spraying device consisting in this instance of a concaved cap J having a depressed center forming a point which overhangs the said tube G and is held in place by suitable supports K.

An umbrella shaped water-shed J' is fitted to the top of the tube G which also assists in the spreading of the water.

A cover L is used on the coffee retainer.

The operation of the device is as follows: Water is poured into the pot to come above the apex of the cones. The water will not enter the receptacle D until said receptacle is heated, when the air is rarefied and water takes its place. It is obvious from the foregoing description that the thin layer of water which will form between the cones B and F will be immediately acted upon by heat when applied beneath the cone B and circulation at once takes place between said cones, while the water which has dropped into receptacle D speedily vaporizes and forces the column of water above it in the tube G upward with considerable force, while it is evident that the water between the cones will be rapidly drawn upward and forced through the tube G against the spraying device J, when percolation ensues. It will be seen then, that the water is in a continuous circulation so long as heat is applied.

What I claim as new, and desire to secure by Letters Patent, is—

1. In a coffee pot, a centrally located receptacle depending from the bottom of the pot and forming the only surface to be heated for the purposes set forth, a channel formed between two cones B and F situated directly above the said receptacle and with which channel said receptacle communicates through an opening or aperture C in the apex of the said receptacle D, and an upwardly extending passage or channel G communicating with the said receptacle D and the channel between said cones B and F substantially in the manner and for the purposes herein set forth and described.

2. A coffee pot provided with two companion cones located at the bottom of said coffee pot, resting point upward, one above another, and slightly separated to form a passage for liquid, the upper cone being provided with a vertical conductor or tube also forming a passage for liquid, the lower cone having an orifice formed in its apex, a centrally located receptacle beneath said lower cone for the generation of steam, said orifice forming an outlet from said receptacle substantially as and for the purposes set forth and described.

3. In a coffee pot, a body or containing vessel provided with an upwardly extending coned bottom B provided with an orifice C at its apex, a containing vessel or receptacle D centrally located on the under side of the said cone B, the apex of the cone B forming the top of the said receptacle and the orifice C therein forming the outlet for said receptacle, said receptacle being provided with a cap E forming the bottom thereof, in combination with a removable cone F supported above the cone B, substantially in the manner and for the purposes set forth, said cone F carrying at its apex a tube G opening through said cone, and carrying on its upper end a spraying device and a containing vessel or cup H substantially in the manner and for the purposes set forth and described.

In testimony whereof I affix my signature in presence of two witnesses.

JOHN S. DUNLAP.

Witnesses:
J. B. WILEY,
A. KEITHLEY.